United States Patent
Liu

(10) Patent No.: US 11,348,108 B2
(45) Date of Patent: May 31, 2022

(54) PAYMENT PROOF GENERATION METHOD AND SYSTEM, AND DEVICE

(71) Applicant: Advanced New Technologies Co., Ltd., Grand Cayman (KY)

(72) Inventor: Jiayin Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/810,683

(22) Filed: Mar. 5, 2020

(65) Prior Publication Data

US 2020/0380525 A1    Dec. 3, 2020

Related U.S. Application Data

(63) Continuation of application No. PCT/CN2020/071263, filed on Jan. 10, 2020.

(30) Foreign Application Priority Data

May 29, 2019   (CN) .......................... 201910455783.5

(51) Int. Cl.
*G06Q 20/40*    (2012.01)
*G06Q 20/10*    (2012.01)
(Continued)

(52) U.S. Cl.
CPC ..... *G06Q 20/40145* (2013.01); *G06K 7/1417* (2013.01); *G06K 19/06* (2013.01);
(Continued)

(58) Field of Classification Search
CPC .......................... G06Q 20/40145; G06Q 10/02
See application file for complete search history.

(56) References Cited

U.S. PATENT DOCUMENTS 11,151,481 B1 * 10/2021 Sun .................. G06K 9/00288
2010/0078475 A1 * 4/2010 Lin ........................ G06Q 50/14
235/380
(Continued)

FOREIGN PATENT DOCUMENTS

CN    104700260    6/2015
CN    105243540    1/2016
(Continued)

OTHER PUBLICATIONS

Etixnow, "I purchased a combined e-ticket . . . ", published Jul. 2016, p. 1, retrieved from URL listed in Allowability Notice, attached (Year: 2016).*

(Continued)

*Primary Examiner* — Shannon S Campbell
*Assistant Examiner* — Bryan J Kirk
(74) *Attorney, Agent, or Firm* — Fish & Richardson P.C.

(57) ABSTRACT

Computer-implemented methods, non-transitory, computer-readable media, and computer-implemented systems for generating proof of payment. One computer-implemented method includes: verifying user information of a plurality of users of a service on a terminal device, wherein the service starts from a start location and ends at an end location, the user information comprises a quantity of the plurality of users, the plurality of users comprise an owner of a service account associated with the service to be paid for by using the terminal device and at least one companion selected by the owner; and in response to the user information of at least the owner is verified, generating at least one proof of payment based on the user information and account information of the service account, wherein the at least one proof of payment is verified at the start location and the end location.

21 Claims, 9 Drawing Sheets

(51) Int. Cl.
  *G06Q 50/30* (2012.01)
  *G06Q 20/20* (2012.01)
  *H04L 9/40* (2022.01)
  *G06K 19/06* (2006.01)
  *G06K 7/14* (2006.01)

(52) U.S. Cl.
  CPC ......... *G06Q 20/108* (2013.01); *G06Q 20/209* (2013.01); *G06Q 50/30* (2013.01); *H04L 63/102* (2013.01); *H04L 63/107* (2013.01); *G06Q 2240/00* (2013.01)

(56) References Cited

U.S. PATENT DOCUMENTS

| | | | | |
|---|---|---|---|---|
| 2012/0296710 | A1* | 11/2012 | Dixon | G06Q 20/382 705/13 |
| 2014/0095227 | A1* | 4/2014 | Parker | G06Q 10/02 705/5 |
| 2015/0081346 | A1* | 3/2015 | Charles | G06Q 10/02 705/5 |
| 2015/0149086 | A1* | 5/2015 | Alberth, Jr. | H04W 4/40 701/519 |
| 2018/0025293 | A1* | 1/2018 | Flotat | H04W 4/80 705/5 |
| 2019/0156254 | A1* | 5/2019 | Hansen | G06Q 10/0631 |
| 2019/0228141 | A1* | 7/2019 | Shimizu | G07C 9/257 |
| 2019/0236852 | A1* | 8/2019 | Ito | G06Q 30/02 |
| 2019/0251482 | A1* | 8/2019 | Zhang | G06Q 20/045 |

FOREIGN PATENT DOCUMENTS

| | | |
|---|---|---|
| CN | 105787722 | 7/2016 |
| CN | 106447328 | 2/2017 |
| CN | 107945287 | 4/2018 |
| CN | 109272583 | 1/2019 |
| CN | 110264199 | 9/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071263, dated Apr. 9, 2020, 19 pages (with machine translation).

* cited by examiner

PAYMENT PROOF GENERATION METHOD AND SYSTEM, AND DEVICE

CROSS-REFERENCE TO RELATED APPLICATIONS

This application is a continuation of PCT Application No. PCT/CN2020/071263, filed on Jan. 10, 2020, which claims priority to Chinese Patent Application No. 201910455783.5, filed on May 29, 2019, and each application is hereby incorporated by reference in its entirety.

TECHNICAL FIELD

The present specification relates to the field of computer technologies, and in particular, to payment proof generation methods, systems, and devices.

BACKGROUND

With continuous popularization of computer networks, electronic payment is increasingly widely applied in people's daily lives. A common application scenario of electronic payment is a payment proof-based first payment scenario. In this scenario, a payer shows, by using a mobile device, a payment proof bound to a payment account of the payer, and a payee obtains the payment proof and links the payment account of the payer based on the payment proof, so as to further implement a payment operation.

For example, in a metro transportation application scenario in the existing technology, a passenger does not need to purchase a ticket through a ticket counter, and only needs to show, by using a mobile device, a QR code bound to an electronic payment account to an access control system on a vehicle or at a station for code-scanning verification. As such, the electronic payment account of the passenger can be used to automatically pay a ticket and enable pass-through, thereby omitting a complex ticket purchase operation.

However, in the metro transportation application scenario described, when multiple fellow passengers travel together but one or more of them do not have a valid QR code (for example, when a mobile device of the passenger fails to obtain a valid QR code due to a network connection failure or an electronic payment account error, or when the passenger forgets to carry a mobile device), the passenger without a valid QR code needs to purchase a ticket through a ticket counter before accessing a station, and the other passengers with QR codes can only wait until the passenger completes the ticket purchase. Consequently, pass-through efficiency is greatly reduced.

SUMMARY

In view of this, implementations of the present specification provide a payment proof generation method and system and a device, so as to resolve a problem in system access security authentication in the existing technology.

The following technical solutions are used according to the implementations of the present specification.

Some implementations of the present specification provides a payment proof generation method, where the method includes the following: confirming participant information of a first payment scenario on a current terminal device, where the participant information includes a quantity of participants, the participants include a local user and/or one or more non-local users selected by the local user, and the local user is a user that succeeds in electronic payment account verification on the current terminal device; and generating a payment proof based on the participant information and account information of an electronic payment account of the local user, where the payment proof is used to perform first payment scenario start point verification and first payment scenario termination point verification in the first payment scenario.

In some implementations of the present specification, the participant information of the first payment scenario is confirmed on the current terminal device, where verification is performed on identities of the local user and the non-local user selected by the local user, the first payment scenario is terminated when the identity of the local user fails to be verified, and the non-local user is rejected to be the participant when the identity of the non-local user fails to be verified.

In some implementations of the present specification, the participant information of the first payment scenario is confirmed on the current terminal device, and the participant information further includes identity information of the participants.

In some implementations of the present specification, the method further includes the following: generating and outputting a physical payment proof by using the current terminal device in a process of generating the payment proof; or when the current terminal device is a mobile device, generating a corresponding electronic payment proof in a process of generating the payment proof, and when performing the first payment scenario start point verification and the first payment scenario termination point verification, outputting the electronic payment proof by using the current terminal device; or generating a corresponding electronic payment proof in a process of generating the payment proof, sending the electronic payment proof to a mobile device specified by the local user, and when performing the first payment scenario start point verification and the first payment scenario termination point verification, outputting the electronic payment proof by using the mobile device.

In some implementations of the present specification, the generating a payment proof includes: separately generating different payment proofs corresponding to the multiple participants.

In some implementations of the present specification, the method further includes the following: in a process of the first payment scenario start point verification or the first payment scenario termination point verification, all participants corresponding to the payment proof successively pass through an access control system corresponding to the first payment scenario start point verification or the first payment scenario termination point verification after the payment proof is successfully verified once; or in a process of the first payment scenario start point verification or the first payment scenario termination point verification, one participant corresponding to the payment proof passes through an access control system corresponding to the first payment scenario start point verification or the first payment scenario termination point verification each time the payment proof is successfully verified.

In some implementations of the present specification, the participant information of the first payment scenario is confirmed on the current terminal device, where after a user successfully logs into the electronic payment account on the current terminal device, it is determined that the user is the local user, the local user is allowed to initiate a participation request for the first payment scenario, and when the local user initiates the participation request, the local user is asked to confirm the participants; or a user is allowed to initiate a participation request for the first payment scenario, when the user initiates the participation request on the current terminal device, it is determined whether the user is capable of successfully logging in to the electronic payment account on the current terminal device, and when the user is capable of successfully logging in to the electronic payment account on the current terminal device, it is determined that the user is the local user and the local user is asked to confirm the participants.

Some implementations of the present specification further provides a fare information returning method, where the method includes the following: obtaining participant information, first payment scenario start point information, and first payment scenario termination point information that correspond to the payment proof according to previous implementations; calculating fare information corresponding to the payment proof based on the first payment scenario start point information, the first payment scenario termination point information, and the participant information; and outputting the fare information.

In some implementations of the present specification, the method further includes the following: after the payment proof is successfully verified at a first payment scenario start point or a first payment scenario termination point, a corresponding access control system successively releases a first quantity of users, and the first quantity is the same as a quantity of participants corresponding to the payment proof; or each time the payment proof is successfully verified at a first payment scenario start point or a first payment scenario termination point, a corresponding access control system releases one user until a quantity of users released by the access control system for the payment proof reaches a quantity of participants corresponding to the payment proof.

Some implementations of the present specification further provides a payment proof generation system, where the system includes the following: a participant confirmation module, configured to confirm participant information of a first payment scenario based on a current terminal device, where the participant information includes a quantity of participants, the participants include a local user and/or one or more non-local users selected by the local user, and the local user is a user that succeeds in electronic payment account verification on the current terminal device; and a payment proof generation module, configured to generate a payment proof based on the participant information and account information of an electronic payment account of the local user, where the payment proof is used to perform first payment scenario start point verification and first payment scenario termination point verification in the first payment scenario.

Some implementations of the present specification further provides a fare information returning system, where the system includes the following: a payment data collection module, configured to obtain participant information, first payment scenario start point information, and first payment scenario termination point information that correspond to the payment proof according to any previous implementations; a settlement module, configured to calculate fare information corresponding to the payment proof based on the first payment scenario start point information, the first payment scenario termination point information, and the participant information of the payment proof; and a fare information output module, configured to output the fare information.

Some implementations of the present specification further provides a device for information processing at an accessing-party device end, where the device includes a memory configured to store a computer program instruction and a processor configured to execute a program instruction, and when the computer program instruction is executed by the processor, the device is triggered to execute the method according to the implementations of the present specification.

The at least one technical solution used according to the implementations of the present specification can achieve the following beneficial effects: According to the method according to the implementations of the present specification, adding the participant information to the payment proof can enable a user to perform a payment operation for another user by using an electronic payment account of the user, without reconstructing an existing payment proof verification procedure or charging mode in a payment scenario, thereby reducing a time consumed by an electronic payment failure of the user, and improving payment efficiency of the payment scenario.

BRIEF DESCRIPTION OF DRAWINGS

The accompanying drawings here are used to provide further understanding of the present specification, and constitute a part of the present specification. Example implementations of the present specification and descriptions of the implementations are used to explain the present specification, and do not constitute an improper limitation to the present specification. In the accompanying drawings.

DESCRIPTION OF IMPLEMENTATIONS

Figure 1:
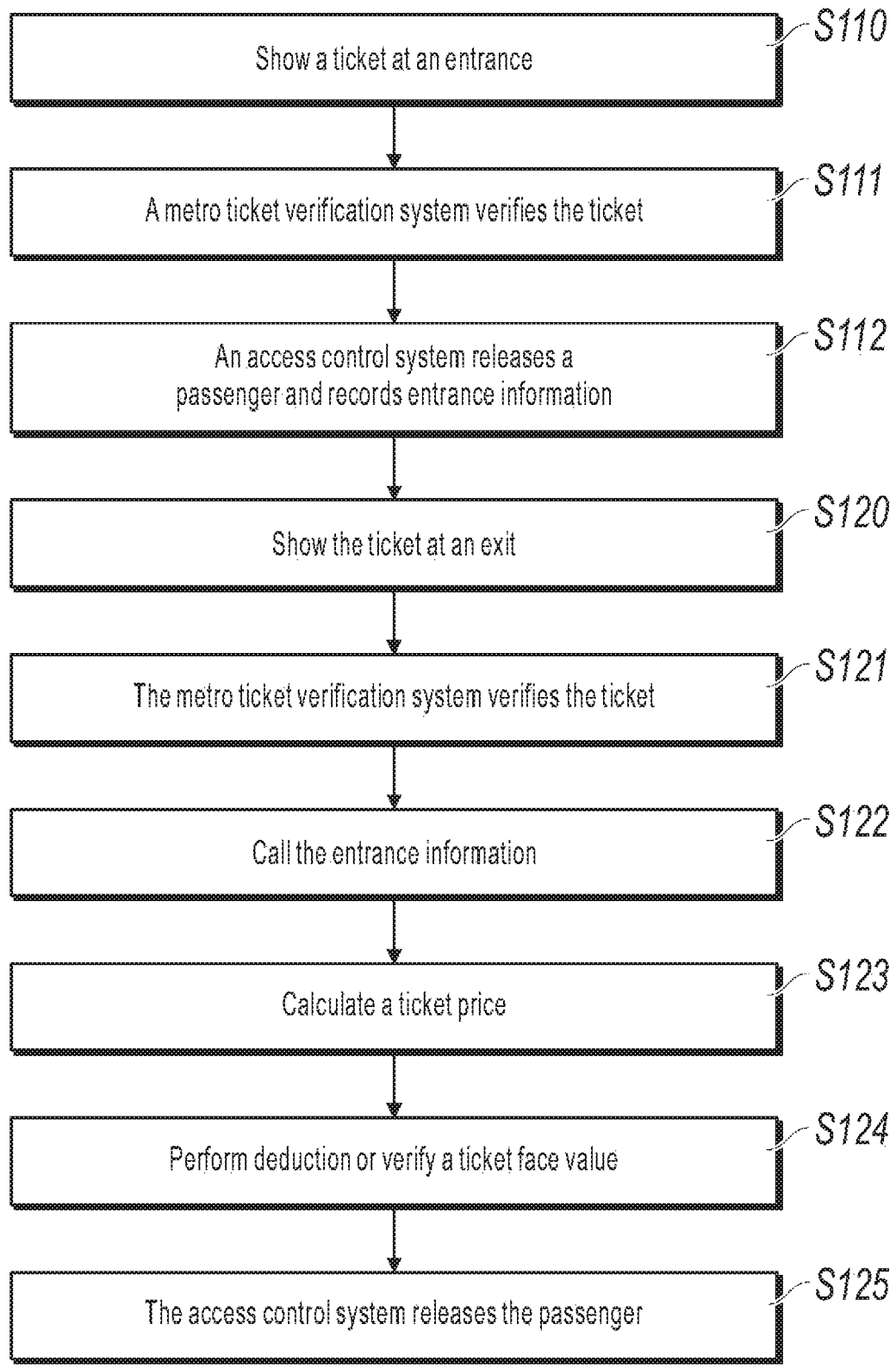
FIG. 1 is an execution flowchart illustrating an application scenario in the existing technology.

To make the objectives, technical solutions, and advantages of the present specification clearer, the following clearly and comprehensively describes the technical solutions of the present specification with reference to specific implementations and accompanying drawings of the present specification. Apparently, the described implementations are merely some rather than all of the implementations of the present specification. Other implementations obtained by a person of ordinary skill in the art based on the implementations of the present specification without creative efforts shall fall within the protection scope of the present specification.

In a metro transportation application scenario in the existing technology, when multiple passengers travel together but at least one of them does not have a valid QR code, the passenger without a valid QR code needs to purchase a ticket through a ticket counter before accessing a station, and the other passengers with QR codes can only wait until the passenger completes the ticket purchase. Consequently, pass-through efficiency is greatly reduced. For the problem described, some implementations of the present specification provides a payment proof generation method, to improve the pass-through efficiency in the case that multiple fellow passengers travel together but at least one of them does not have a valid QR code. The present specification first illustrates an existing first payment scenario so as to provide the method proposed in the implementations of the present specification.

In an existing metro transportation application scenario, one passenger uses one QR code, and the QR code is bound to an electronic payment account. The passenger cannot provide a QR code for another passenger based on his/her own electronic payment account. Consequently, if a passenger cannot obtain a valid QR code through the passenger's own electronic payment account, the passenger cannot obtain a QR code through electronic payment accounts of others. The reason is as follows: The passenger needs to log in to his/her own electronic payment account on another passenger's mobile device, as login of an electronic payment account is needed for using a QR code. However, for payment security, one mobile device generally does not allow simultaneous login of multiple electronic payment accounts, and switching between multiple electronic payment accounts may increase operational complexity. Even if one mobile device allows simultaneous login of multiple electronic payment accounts, complex login operations are caused due to uncertainty of travel companions. In addition, if the passenger logs into his/her own electronic payment account on another passenger's mobile device, electronic payment security may be reduced.

Based on the analysis described, for improving pass-through efficiency of a passenger that fails to obtain a valid QR code by himself/herself, one direct solution is to change the policy that one passenger uses one QR code, and the QR code is bound to an electronic payment account one to one, so that an electronic payment account of a passenger can provide another passenger with a valid QR code. As such, a passenger can obtain a valid QR code through an available mobile device when the passenger forgets to carry his/her own mobile device or when a mobile device of the passenger encounters a network connection failure or an electronic payment account error.

However, in the existing technology, the QR code policy is based on metro ticket verification system policies and ticket fare policies. To modify the QR code policy, a ticket verification procedure and policy of the entire metro ticket verification system need to be modified accordingly, which increases implementation difficulty. Therefore, in some implementations of the present specification, the metro ticket verification system policy and the fare charging policy are analyzed, so that modifying the QR code policy does not lead to corresponding modification of the ticket verification procedure and policy of the metro ticket verification system.

To ensure safety, an access control policy of double ticket verification is adopted in a metro system. To be specific, a ticket is verified once at an entrance and verified again at an exit under the double ticket verification. Further, in a metro system with a non-fixed ticket price (e.g., a ticket price is determined relative to distance traveled), the access control policy of double ticket verification further provides support for ticket price calculation. To be specific, entrance information is recorded when a ticket is verified at an entrance, and a ticket price is calculated and fare is charged based on the recorded entrance information and current exit information when the ticket is verified at an exit.

Specifically, as shown in FIG. 1, in an actual metro scenario, a procedure for verifying a regular ticket is as follows:

S110: A user enters a station and shows a ticket at an entrance.

S111: A metro ticket verification system verifies ticket validity.

S112: When the ticket is valid, an access control system releases the user, and the metro ticket verification system records entrance information corresponding to the ticket.

S120: The user arrives at a destination, gets off, and shows the ticket at an exit.

S121: The metro ticket verification system verifies the ticket validity.

S122: When the ticket is valid, the metro ticket verification system identifies the ticket, and calls the entrance information corresponding to the ticket.

S123: The metro ticket verification system calculates a ticket price based on exit information obtained through current ticket verification and the called entrance information.

S124: The metro ticket verification system performs a ticket price deduction operation on a prepaid ticket or performs a face value verification operation on a ticket with a fixed face value based on the calculated ticket price.

S125: When the ticket price deduction operation succeeds or the face value of the ticket matches the calculated ticket price, the access control system releases the user.

In a QR code application scenario, the ticket is replaced with a QR code. Based on the ticket verification procedure and the QR code policy, it can be ensured that only one QR code is used in one ticket verification procedure for a particular passenger, thereby ensuring that entrance and exit verification is safe and effective and ticket price calculation is correct.

Further, for the metro ticket verification system, the passengers can differ in their in and out stations (or entrance and exit stations). If a group of passengers have the same in and out stations (or entrance and exit stations), the metro ticket verification system can, in theory, consider the group of passengers as one special passenger, and only needs to modify a ticket price calculation rule (multiplying by the number of passengers). As such, an original ticket verification procedure can be used to verify a ticket for the special passenger, so as to ensure safe and effective entrance and exit verifications and correct ticket price calculations.

Based on the above, if a QR code can notify the metro ticket verification system that a current group of passengers are passengers with the same in and out stations (entrance and exit stations), the metro ticket verification system can verify a ticket for the group of passengers based on the QR code without changing the ticket verification procedure (only the ticket price calculation rule needs to modified). Therefore, in the method in some implementations of the present specification, information content included in a QR code is increased, and quantity information of fellow passengers is added. The quantity information is used to notify the metro ticket verification system that a current QR code corresponds to a group of passengers, so that ticket purchase and ticket verification can be performed by using one electronic payment account for multiple passengers that have the same in and out stations (entrance and exit stations).

Notably, although the metro transportation application scenario is described above, an application scenario according to the implementations of the present specification is not limited to the metro transportation application scenario. Any payment scenario that is similar to the metro transportation application scenario described and has a double verification policy (a payment scenario with start point verification and payment scenario termination point verifications) can apply the method according to the implementations of the present specification (for example, a bus application scenario and a train application scenario).

Further, a QR code can be used as a replacement of a ticket to implement electronic fare payment and electronic ticket verification in the application scenario described. However, according to the implementations of the present specification, in addition to a QR code, any electronic proof with a function similar to the QR code can be used as a replacement of a ticket to implement electronic fare payment and electronic ticket verification (for example, an NFC electronic proof and a Bluetooth electronic proof).

The technical solutions provided according to the implementations of the present specification are described in detail below with reference to the accompanying drawings.

Figure 2:
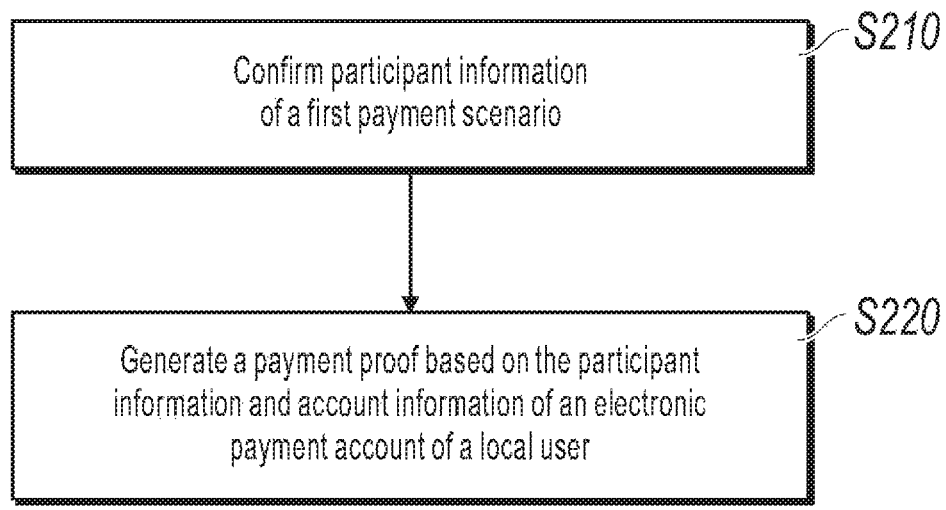
FIG. 2 and FIG. 7 are flowcharts illustrating an application program running method, according to some implementations of the present specification.

In some implementations of the present specification, as shown in FIG. 2, an electronic payment method includes the following steps.

S210: Confirm participant information of a first payment scenario on a current terminal device, where the participant information includes a quantity of participants in the first payment scenario, the participants in the first payment scenario include a local user and/or one or more non-local users selected by the local user, and the local user is a user that succeeds in electronic payment account verification on the current terminal device.

S220: Generate a payment proof based on the participant information and account information of an electronic payment account of the local user (specifically, an electronic payment account of the local user that succeeds in electronic payment account verification on the current terminal device), where the payment proof is used to perform first payment scenario start point verification and first payment scenario termination point verification in the first payment scenario.

In some implementations of the present specification, the method further includes the following: receiving fare information corresponding to the payment proof; and calling the electronic payment account of the local user, and performing an electronic payment operation based on the fare information.

According to the method in some implementations of the present specification, adding the participant information to the payment proof can enable a user to perform a payment operation for another user by using an electronic payment account of the user, without reconstructing an existing payment proof verification procedure or charging mode in a payment scenario, thereby reducing a time consumed by an electronic payment failure of the user, and improving payment efficiency of the payment scenario.

Further, to ensure payment security and reduce unauthorized use of electronic payment accounts, in some implementations of the present specification, the electronic payment method further includes invalidating the payment proof after the first payment scenario termination point verification is completed for the payment proof.

Specifically, in some implementations of the present specification, in a process of confirming the participant information of the first payment scenario, the participant can be the local user that successfully logs into the current terminal device. For example, in the metro transportation application scenario, the participant can be a user currently holding a mobile device.

Specifically, in some implementations of the present specification, in a process of confirming the participant information of the first payment scenario, the participants can be the local user that successfully logs into the current terminal device and the one or more non-local users selected by the local user. For example, in the metro transportation application scenario, the participants can be a user currently holding a mobile device and fellow passengers of the user.

Specifically, in some implementations of the present specification, in a process of confirming the participant information of the first payment scenario, the participants can be the local user that successfully logs into the current terminal device and the one or more non-local users selected by the local user. For example, in the metro transportation application scenario, the participants can be one or more passengers designated by a user currently holding a mobile device.

Further, some implementations of the present specification does not specifically limit a process of obtaining the participant information, as long as it is ensured that the participants corresponding to the participant information are the local user and/or the non-local user selected by the local user. The local user needs to be a user that can successfully log in to the electronic payment account on the current terminal device. Further, in some implementations of the present specification, successfully logging in to the electronic payment account on the current terminal device further includes succeeding in identity verification on the current terminal device.

Figure 3:
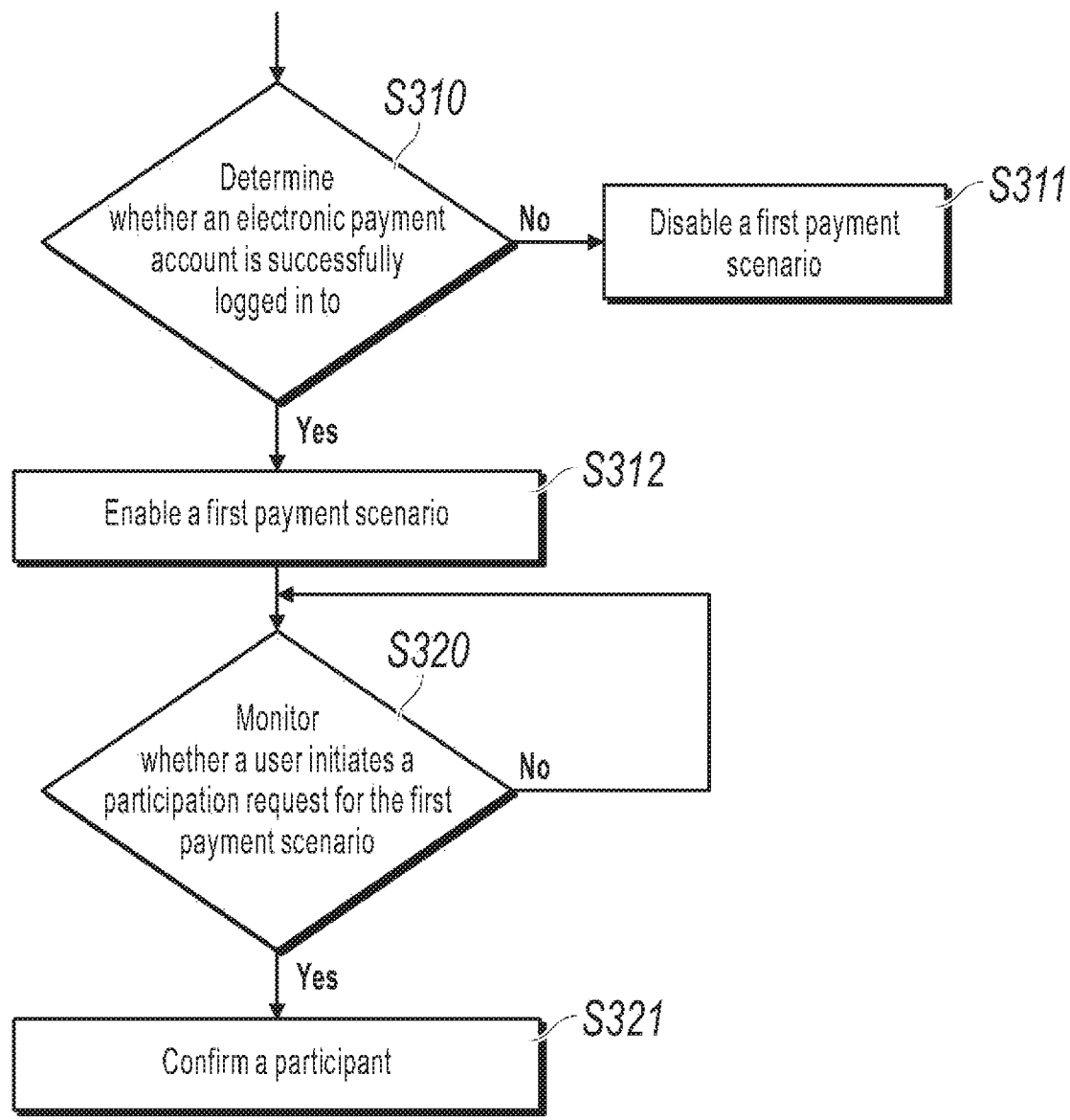
FIG. 3 to FIG. 5 are partial flowcharts illustrating an application program running method, according to some implementations of the present specification.

Specifically, in some implementations of the present specification, as shown in FIG. 3, the participant information of the first payment scenario is confirmed on the current terminal device, including the following steps.

S310: Determine whether the user successfully has logged into the electronic payment account on the current terminal device.

S311: When a user fails to log in to the electronic payment account on the current terminal device, forbid the user from initiating a participation request for the first payment scenario.

S312: After a user successfully logs into the electronic payment account on the current terminal device, consider that the user is the local user, and allow the local user to initiate a participation request for the first payment scenario.

S320: Monitor whether the local user initiates a participation request for the first payment scenario.

S321: When the local user initiates a participation request for the first payment scenario, ask the local user to confirm the participants in the first payment scenario.

Figure 4:
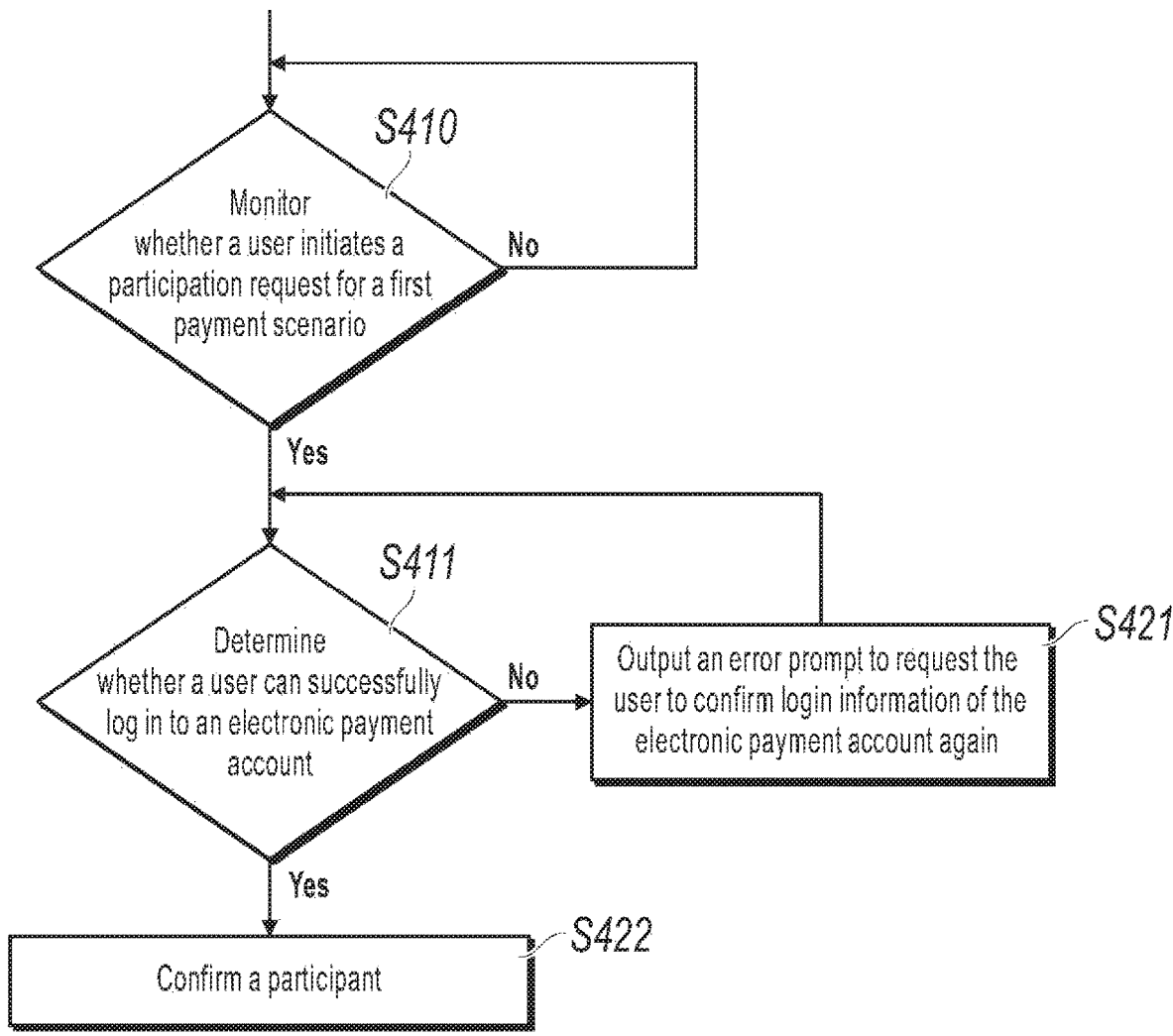

Specifically, in some implementations of the present specification, as shown in FIG. 4, the participant information of the first payment scenario is confirmed on the current terminal device, including the following steps.

S410: Monitor whether the user initiates a participation request for the first payment scenario (the current terminal device always allows the user to initiate a participation request for the first payment scenario).

S411: When the user initiates a participation request for the first payment scenario on the current terminal device, determine whether the user can successfully log in to the electronic payment account on the current terminal device.

S421: When the user can successfully log in to the electronic payment account on the current terminal device, output an error prompt to request the user to confirm login information of the electronic payment account again.

S422: When the user can successfully log in to the electronic payment account on the current terminal device, consider that the user is the local user and ask the local user to confirm the participants.

Specifically, in some implementations of the present specification, at step S411 shown in FIG. 4, a process of determining whether the user can successfully log in to the electronic payment account on the current terminal device includes the following: determining whether the user successfully logs into the electronic payment account on the current terminal device; and if the user fails to log in to the electronic payment account on the current terminal device, requesting the current user to perform login verification on the electronic payment account.

Further, to prevent an invalid user from participating in a payment scenario (for example, preventing a person of restricted travel from taking the metro), in some implementations of the present specification, when the participant information of the first payment scenario is confirmed on the current terminal device, identity verification needs to be performed on the local user and/or the non-local user that are expected to be participants. Specifically, in some implementations of the present specification, verification is performed on identities of the local user and the non-local user selected by the local user. The first payment scenario is terminated when the identity of the local user fails to be verified, and the non-local user is rejected to be the participant of the first payment scenario when the identity of the non-local user fails to be verified. In other words, if the non-local user fails the identity verification, the non-local user is prevented from participating in the first payment scenario. If the local user fails the identity verification, the local user is prevented from participating in the first payment scenario and/or the local user is prevented from paying for the first payment scenario by using the electronic payment account of the local user.

Notably, although the local user has already performed identity verification once when logging in to his/her own electronic payment account, the identity verification only determines whether the local user has permission to log in to the electronic payment account, but does not determine whether the local user is allowed to participate in the first payment scenario. In some implementations of the present specification, identity verification further needs to be performed for the local user, to determine whether the local user is allowed to participate in the first payment scenario.

Figure 5:
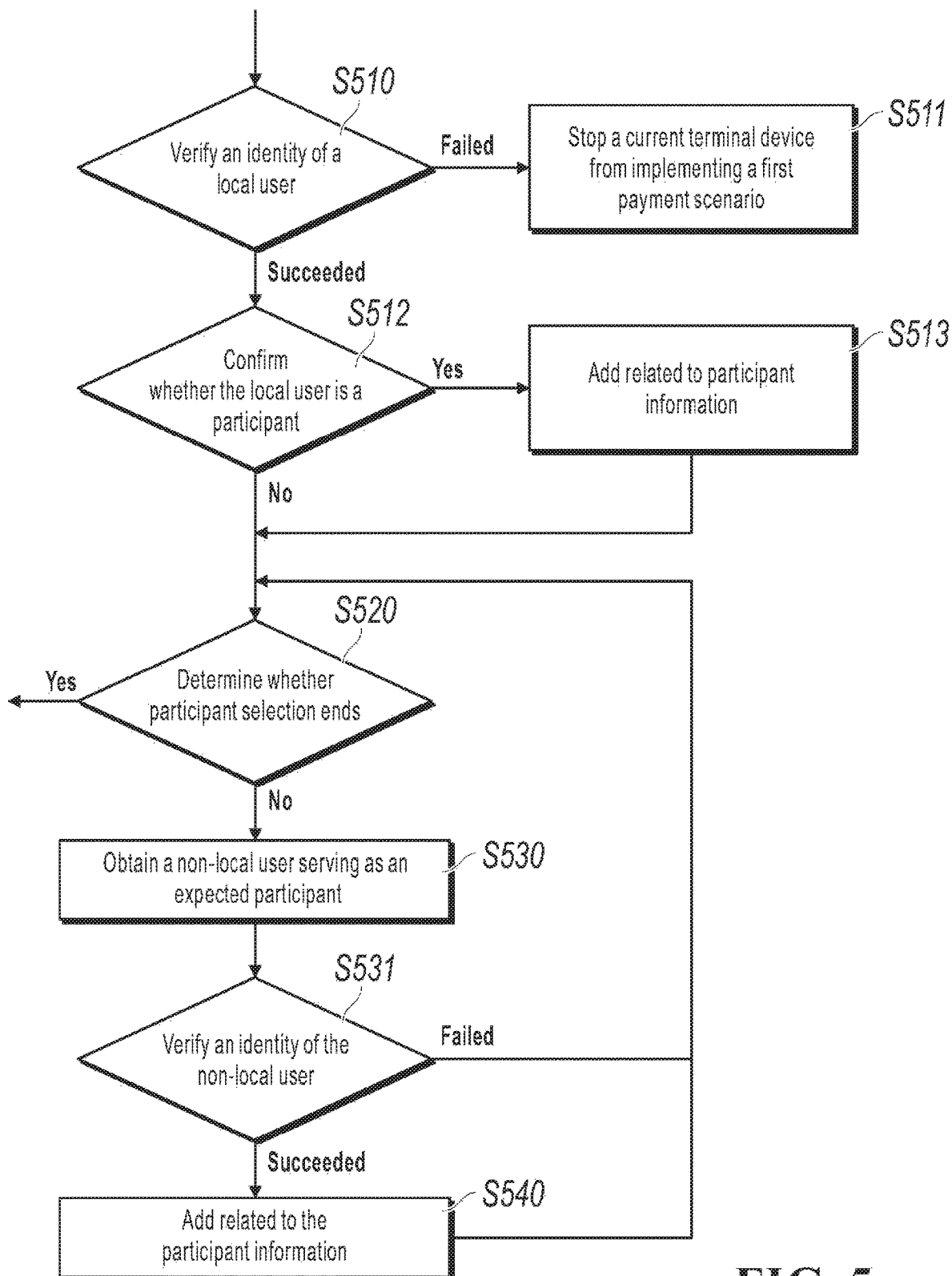

Specifically, as shown in FIG. 5, in some implementations of the present specification, in a process of confirming the participant information of the first payment scenario on the current terminal device, the following steps are included:

S510: Verify the identity of the local user.

S511: Stop the current terminal device from implementing the first payment scenario when the verification at S510 fails.

S512: Confirm whether the local user is a participant when the verification at S510 succeeds.

S513: Add related data to the participant information and proceed to step S520 when it is confirmed at S512 that the local user is a participant.

The process proceeds to step S520 when it is confirmed at S512 that the local user is not the participant.

S520: Determine whether participant selection has ended.

S530: When it is determined at S520 that the participant selection has not ended, obtain a non-local user that is selected by the local user as an expected participant.

S531: Perform identity verification on the non-local user obtained at S530.

S540: Determine that the non-local user is a participant, add related data to the participant information, and proceed to step S520 when the verification at S531 succeeds.

When the verification at S531 fails, the process proceeds to step S520.

Specifically, in some implementations of the present specification, the verification on the identities/identity of the local user and/or the non-local user is performed through face recognition.

Specifically, in some implementations of the present specification, the verification on the identities/identity of the local user and/or the non-local user is performed based on the electronic payment account. Specifically, during the verification on the identities/identity of the local user and/or the non-local user, the corresponding electronic payment account is called, and the identities/identity of the local user and/or the non-local user are/is confirmed based on the electronic payment account.

Figure 6:
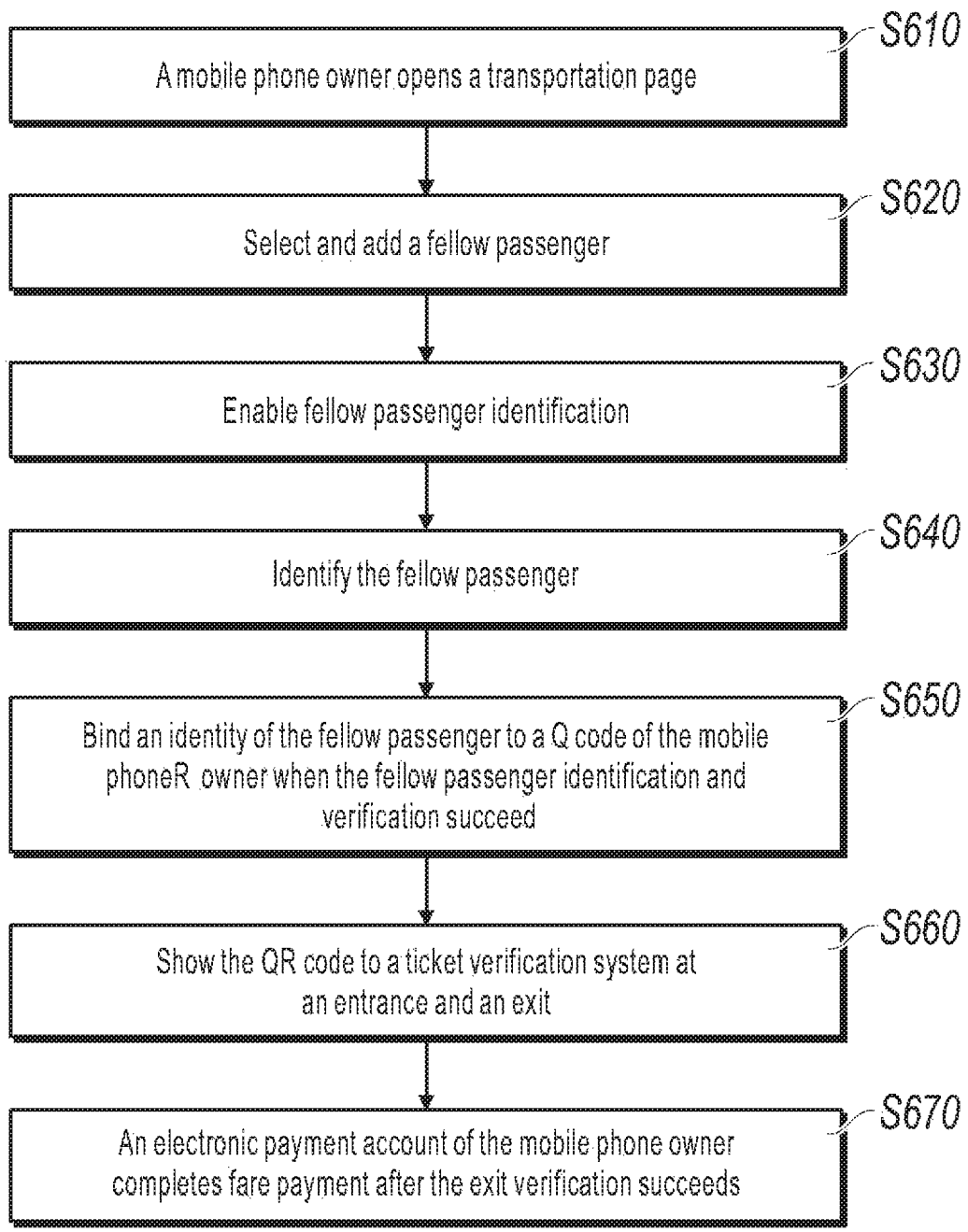
FIG. 6 and FIG. 8 are execution flowcharts illustrating an application scenario, according to some implementations of the present specification.

Specifically, as shown in FIG. 6, in some implementations of the present specification, an electronic payment process in an application scenario includes the following steps.

S610: A mobile phone owner that has successfully logged in to an electronic payment account opens a transportation page.

S620: Select a fellow passenger on the transportation page.

S630: Enable fellow passenger identification (for example, face recognition).

S640: Identify the fellow passenger.

S650: Bind an identity of the fellow passenger to a QR code of the mobile phone owner when the fellow passenger identification and verification succeed.

S660: Show the QR code to a ticket verification system at an entrance and an exit.

S670: The electronic payment account of the mobile phone owner completes fare payment after the exit verification succeeds.

Further, to ensure security of a payment scenario and prevent an invalid user from participating in the payment scenario, in some implementations of the present specification, the participant information further includes identity information of the participants in a process of confirming the participant information of the first payment scenario on the current terminal device. Specifically, the payment proof generated based on the participant information also includes the identity information of the participants. When verifying the payment proof, the verification system of the payment scenario can verify identities of the participants at the same time, thereby determining whether the participants are valid.

Further, some implementations of the present specification does not specifically limit the current terminal device. Any device that can perform login verification on an electronic payment account of a user, collect participant information, and generate a payment proof can be used as the current terminal device.

Specifically, in some application scenarios, a user owns a terminal device and wants to create a payment proof for himself/herself and/or another user by using his/her own electronic payment account and terminal device. Therefore, in some implementations of the present specification, the current terminal device is a device owned by a current user, and the current user is a local user of the device. The user creates a payment proof for himself/herself and/or the selected non-local user based on his/her own device, and uses his/her own electronic payment account for payment.

For example, in an application scenario, a user creates, by using his/her own mobile phone or computer, a payment proof for transportation for the user and/or a passenger selected by the user. A fare is deducted from an electronic payment account of the user after the transportation.

Specifically, in some application scenarios, a user does not own a terminal device but wants to create a payment proof for himself/herself and/or another user by using his/her own electronic payment account. Therefore, in some implementations of the present specification, the current terminal device is a public device, and the current user temporarily becomes the local user of the current terminal device after the current user succeeds in login verification of the electronic payment account on the current terminal device. The user creates a payment proof for himself/herself and/or the selected non-local user based on the current terminal device, and uses his/her own electronic payment account for payment. In addition, when the user stops using the current terminal device, the user is logged off from the electronic payment account on the current terminal device.

For example, in an application scenario, a user uses a public terminal device at a station to perform login verification on an electronic payment account, and after the verification succeeds, the user creates, by using the public terminal device and based on the electronic payment account of the user, a payment proof for transportation for the user and/or a passenger selected by the user. A fare is deducted from the electronic payment account of the user after the transportation. In addition, after the payment proof is generated, the user is logged off from the electronic payment account on the public terminal device when the user stops using the public terminal device.

Further, because the payment proof is used to perform the first payment scenario start point verification and the first payment scenario termination point verification in the first payment scenario, the payment proof needs to be portable, that is, the payment proof can be a physical payment proof (for example, a ticket) that can be carried by the user or an electronic payment proof (for example, a QR code) that can be saved and output by a mobile device.

There may be no mobile device available to a user in in some application scenarios. Therefore, in some implementations of the present specification, the electronic payment method further includes the following: generating and outputting a physical payment proof by using the current terminal device in a process of generating the payment proof. As such, even if there is no available mobile device, the user can carry a physical payment proof in the first payment scenario to perform the first payment scenario start point verification and the first payment scenario termination point verification.

For example, in an application scenario, a user uses a public terminal device at a station to perform login verification on an electronic payment account, and after the verification succeeds, the user creates, by using the public terminal device and based on the electronic payment account of the user, a payment proof for transportation for the user and/or a passenger selected by the user. The public terminal device finally provisions a physical magnetic card ticket or a QR code to the user.

Further, the current terminal device is a mobile device available to the user in some application scenarios. Therefore, in some implementations of the present specification, the electronic payment method further includes the following: when the current terminal device is a mobile device, generating a corresponding electronic payment proof in a process of generating the payment proof, and when performing the first payment scenario start point verification and the first payment scenario termination point verification, outputting the electronic payment proof by using the current terminal device.

For example, in an application scenario, the current terminal device is a mobile device (for example, a mobile phone) of a user, and the user creates, by using his/her own mobile device, an electronic payment proof for transportation for the user and/or a passenger selected by the user. The user shows a QR code of the electronic payment proof to a ticket verification machine by using the mobile device at an entrance and an exit.

Further, in some application scenarios, there may be a mobile device that can be used to perform the first payment scenario start point verification and the first payment scenario termination point verification, but the mobile device cannot be used to generate payment proofs. Therefore, in some implementations of the present specification, the electronic payment method further includes the following: generating a corresponding electronic payment proof in a process of generating the payment proof, sending the electronic payment proof to a mobile device specified by the local user, and when performing the first payment scenario start point verification and the first payment scenario termination point verification, outputting the electronic payment proof by using the mobile device receiving the electronic payment proof.

For example, in an application scenario, a mobile device carried by a user cannot be used to generate a payment proof (for example, the mobile device carried by the user is bound to another electronic payment account). The user uses a public terminal device at a station to perform login verification on the electronic payment account, and after the verification succeeds, the user creates, by using the public terminal device and based on the electronic payment account of the user, an electronic payment proof for transportation for the user and/or a passenger selected by the user. Then, the public terminal device sends the electronic payment proof (for example, a QR code) to the mobile device carried by the user.

Further, in some implementations of the present specification, after the local user generates the corresponding electronic payment proof based on the electronic payment account of the local user, the electronic payment proof is sent to a mobile device specified by the local user and carried by another passenger. As such, even if the local user is not a participant in a payment scenario, the local user can pay for others by using the electronic payment account of the local user.

For example, in an application scenario, a user is not going to travel. However, the user uses his/her own terminal to perform login verification on an electronic payment account, and after the verification succeeds, the user creates, based on the electronic payment account of the user, an electronic payment proof for transportation for a passenger selected by the user. Then, the electronic payment proof (for example, a QR code) is sent to a mobile device carried by the passenger selected by the user.

Further, in some implementations of the present specification, the generating a payment proof includes: separately generating different payment proofs corresponding to the multiple participants. As such, on a premise that a single payment proof is unique, payment proof verification can be performed separately for each participant, and centralized payment proof verification is not required, thereby improving execution flexibility of the verification operation, ensuring accuracy of the verification for each participant, and reducing disordered verification.

Figure 7:
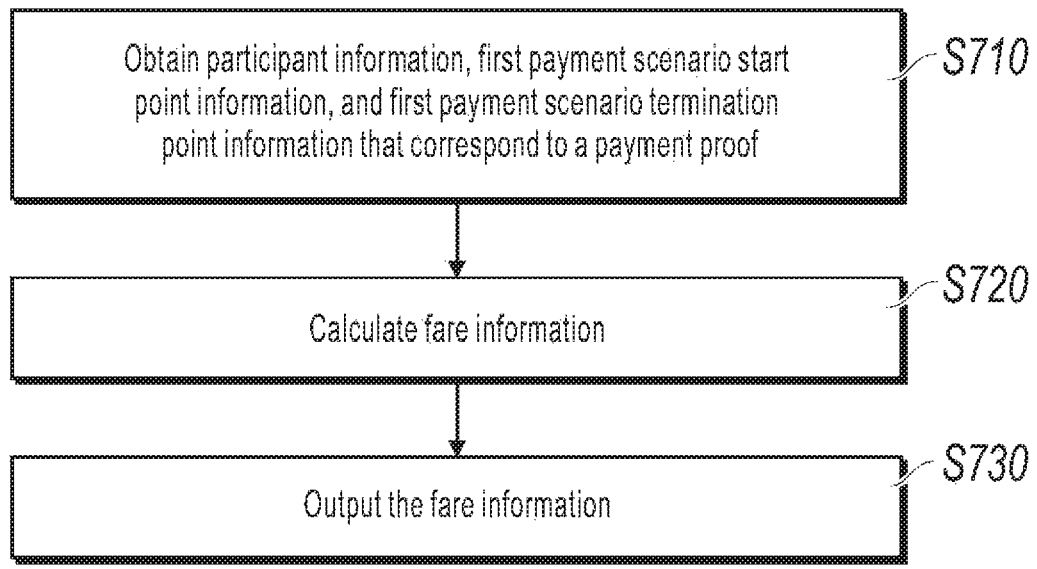

Further, based on the electronic payment method according to the implementations of the present specification, some implementations of the present specification further provides a fare information returning method. Specifically, in some implementations of the present specification, as shown in FIG. 7, the fare information returning method includes the following steps.

S710: Obtain participant information, first payment scenario start point information, and first payment scenario termination point information that correspond to the payment proof in the electronic payment method according to the implementations of the present specification.

S720: Calculate fare information corresponding to the payment proof based on the first payment scenario start point information, the first payment scenario termination point information, and the participant information that are obtained.

S730: Output the fare information.

Specifically, in some implementations of the present specification, a first payment scenario includes multiple verification points, and in each process of performing the first payment scenario, payment proof verification is performed at two of the multiple verification points. The first verification point for performing the payment proof verification in the first payment scenario is referred to as a first payment scenario start point, and the second verification point for performing the payment proof verification in the first payment scenario is referred to as a first payment scenario termination point. After the payment proof verification succeeds at the first payment scenario termination point and payment is completed, the first payment scenario ends.

Specifically, in some implementations of the present specification, a charging system in the first payment scenario monitors input of the payment proof, performs verification when the payment proof is collected, and after the verification succeeds, determines whether the payment proof records first payment scenario start point information. If not, the charging system records the first payment scenario start point information corresponding to the payment proof based on current verification point information used for payment proof verification. If yes, the charging system calls the recorded first payment scenario start point information, and calculates the fare information based on the called first payment scenario start point information and the current verification point information used for payment proof verification.

Specifically, in some implementations of the present specification, at step 5730, the fare information is sent to a service system that is authorized to call a corresponding electronic payment account and perform a payment operation. For example, in an application scenario, the fare information is sent to the mobile device that is owned by the local user and that has successfully logged into an electronic payment account of the local user. Or, in an application scenario, the fare information is sent to a backend server of the electronic payment account of the local user.

Figure 8:
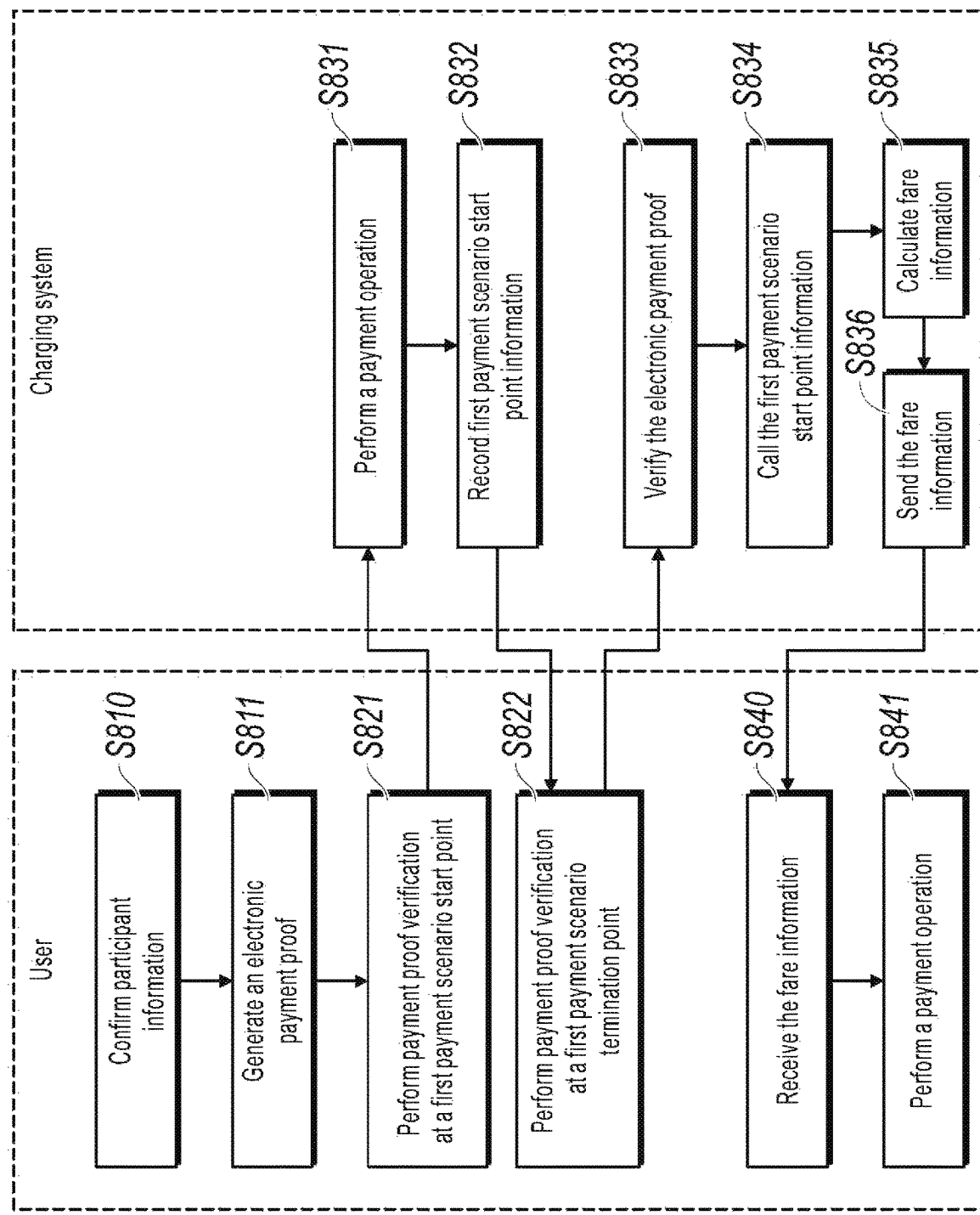

Specifically, in some implementations of the present specification, the current terminal device is a mobile device, an owner of the mobile device is the local user, and the local user is one of the participants in the first payment scenario. The local user outputs the payment proof through his/her own mobile device. As shown in FIG. 8, in an application scenario, the following steps are included.

S810: A user confirms participant information of a current first payment scenario (for example, a metro transportation application scenario) on a related electronic payment application program on a mobile device, and determines a quantity of participants other than the user (for example, a quantity of fellow passengers of the current user during metro transportation).

S811: The electronic payment application program calls payment account information of an electronic payment account that the current user successfully logs in to, and generates an electronic payment proof based on the participant information.

S821: The user outputs the electronic payment proof by using a mobile device, and performs payment proof verification (first payment scenario start point verification) at a first payment scenario start point (for example, a metro entrance).

S831: A charging system (for example, a metro ticket verification system) corresponding to the payment scenario verifies the electronic payment proof.

S832: After the payment proof is successfully verified, the charging system records first payment scenario start point information corresponding to the payment proof.

S822: The user outputs the payment proof by using the mobile device, and performs payment proof verification (first payment scenario termination point verification) at a first payment scenario termination point (for example, a metro exit).

S833: The charging system (for example, the metro ticket verification system) corresponding to the payment scenario verifies the payment proof.

S834: After the payment proof is successfully verified, the charging system calls the recorded first payment scenario start point information.

S835: The charging system obtains fare information corresponding to the payment proof through calculation.

S836: The charging system sends the fare information to the mobile device of the user.

S840: The mobile device of the user receives the fare information.

S841: Call an electronic payment account successfully logged in to by the current user to perform a payment operation.

Further, in an actual application scenario, an access control system is generally disposed at a payment proof verification point, and only a passenger corresponding to a successfully verified payment proof can be released by the access control system. In some application scenarios according to the implementations of the present specification, a payment proof corresponds to more than one participant. Therefore, in some implementations of the present specification, an access control policy is proposed for an application scenario with one payment proof used for multiple participants.

Specifically, in some implementations of the present specification, the access control system includes a gate machine system in a metro, a high-speed railway, etc.

Specifically, in some implementations of the present specification, during the first payment scenario start point verification or the first payment scenario termination point verification in the electronic payment method, after the payment proof is successfully verified once, all participants corresponding to the payment proof successively pass through the access control system corresponding to the first payment scenario start point verification or the first payment scenario termination point verification.

Correspondingly, in some implementations of the present specification, in the fare information returning method, after the payment proof is successfully verified at the first payment scenario start point or the first payment scenario termination point, the corresponding access control system successively releases a first quantity of users. The first quantity is the same as a quantity of participants corresponding to the payment proof.

Specifically, in some implementations of the present specification, during the first payment scenario start point verification or the first payment scenario termination point verification in the electronic payment method, each time a payment proof is successfully verified, one participant corresponding to the payment proof passes through the access control system corresponding to the first payment scenario start point verification or the first payment scenario termination point verification.

Correspondingly, in some implementations of the present specification, in the fare information returning method, each time a payment proof is successfully verified at the first payment scenario start point or the first payment scenario termination point, the corresponding access control system releases one user, until a quantity of users released by the access control system for the payment proof reaches a quantity of participants corresponding to the payment proof.

Figure 9:
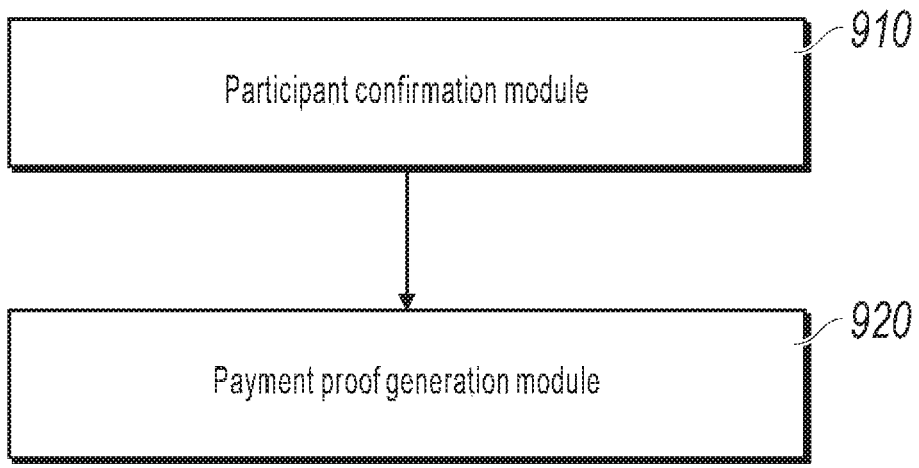
FIG. 9 and FIG. 10 are structural block diagrams illustrating a system, according to some implementations of the present specification.

Further, based on the electronic payment method according to the implementations of the present specification, some implementations of the present specification further provides a payment proof generation system. Specifically, in some implementations of the present specification, as shown in FIG. 9, the electronic payment system includes the following: a participant confirmation module 910, configured to confirm participant information of a first payment scenario based on a current terminal device, where the participant information includes a quantity of participants, the participants include a local user and/or one or more non-local users selected by the local user, and the local user is a user that succeeds in electronic payment account verification on the current terminal device; and a payment proof generation module 920, configured to generate a payment proof based on the participant information and account information of an electronic payment account of the local user, where the payment proof is used to perform first payment scenario start point verification and first payment scenario termination point verification in the first payment scenario.

Figure 10:
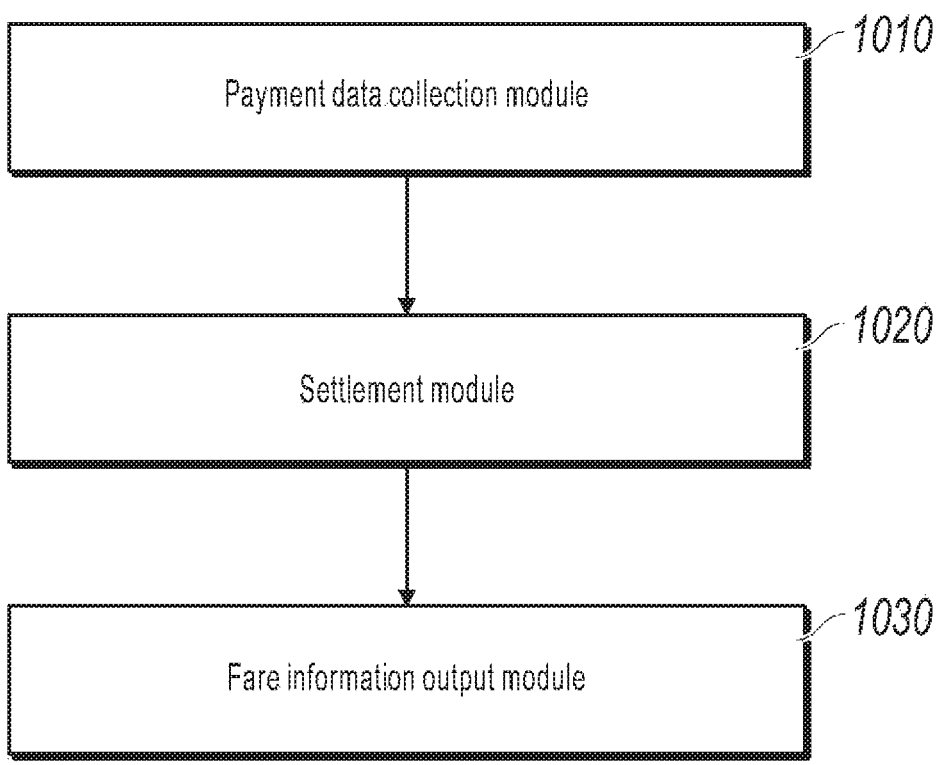

Further, based on the fare information returning method according to the implementations of the present specification, some implementations of the present specification further provides a fare information returning system. Specifically, in some implementations of the present specification, as shown in FIG. 10, the fare information returning system includes the following: a payment data collection module 1010, configured to obtain participant information, first payment scenario start point information, and first payment scenario termination point information that correspond to the payment proof generated by the electronic payment system according to the implementations of the present specification; a settlement module 1020, configured to calculate fare information corresponding to the payment proof based on the first payment scenario start point information, the first payment scenario termination point information, and the participant information of the payment proof that are obtained by the payment data collection module 1010; and a fare information output module 1030, configured to output the fare information generated by the settlement module 1020.

Further, based on the method of the present specification, the present specification further provides a device for information processing at an accessing-party device end, where the device includes a memory configured to store computer programming instructions and a processor configured to execute the computer programming instructions, and when the computer program instruction is executed by the processor, the device is triggered to execute the method according to the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by an accessing party through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate manner. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that some implementations of the present specification can be provided as a method, a system, or a computer program product. Therefore, the present specification can use a form of hardware only implementations, software only implementations, or implementations with a combination of software and hardware. Moreover, the present specification may use a form of a computer program product that is implemented on one or more computer-usable storage media (including but not limited to a disk memory, a CD-ROM, an optical memory, and the like) that include computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory may include a non-persistent memory, a random access memory (RAM), a non-volatile memory, and/or another form in a computer readable medium, for example, a read-only memory (ROM) or a flash random access memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present specification, and are not intended to limit the present specification. A person skilled in the art can make various modifications and changes to the present specifica-

What is claimed is:

1. A computer-implemented method for generating proof of payment, the method comprising:
   selecting, through a local terminal device associated with an owner of a service account associated with a service, a plurality of participants of a service, wherein the service for each of the plurality of participants starts at a start location and ends at an end location;
   verifying, by the local terminal device, user information of the owner;
   verifying, by the local terminal device based on facial recognition, identities of the plurality of participants;
   in response to successful verification of at least the user information of the owner and the identities of the plurality of participants, generating, by the local terminal device based on account information of the service account, one or more proof of payments for the plurality of participants by associating the verified identities of the plurality of participants to the one or more proof of payments and, wherein information content of each of the one or more proof of payments comprises quantity information indicating a quantity of participants of the plurality of participants having a same start location and a same end location;
   sending the one or more proof of payments and the identities of the plurality of participants to a payment verification system to verify a corresponding proof of payment for a corresponding quantity of participants;
   in response to the one or more proof of payments being verified, allowing an access control system to release the quantity of participants at the start location;
   sending, by the local terminal device, the one or more proof of payments to corresponding terminal devices of the plurality of participants; and
   in response to determining that the quantity of participants of the plurality of participants exit the same end location by presenting the corresponding proof of payment received on a participating terminal device associated with one of the plurality of participants, deducting a payment from the service account.

2. The computer-implemented method of claim 1, wherein verifying the user information includes verifying an identity of the owner, and the one or more proof of payments prove payments for the plurality of participants by the owner of the local terminal device.

3. The computer-implemented method of claim 2, wherein the identity of the owner is verified if the service account is successfully logged in.

4. The computer-implemented method of claim 1, wherein verifying the user information includes:
   verifying that the owner has successfully logged in to the service account; and
   verifying the user information of the plurality of participants is performed after the plurality of participants are selected by the owner through the service account.

5. The computer-implemented method of claim 1, wherein the one or more proof of payments are one or more electronic proofs generated by the local terminal device.

6. The computer-implemented method of claim 1, wherein the service is a public transportation service, the plurality of participants are one or more passengers, the same start location is a departure station and the same end location is an arrival station.

7. The computer-implemented method of claim 1, wherein the one or more proof of payments are one or more two-dimensional codes and the one or more proof of payments are verified for a number of times that equals a number of the plurality of participants whose identities are successfully verified.

8. A computer-implemented system for generating proof of payment, comprising:
   one or more computers; and
   one or more computer memory devices interoperably coupled with the one or more computers and having tangible, non-transitory, machine-readable media storing one or more instructions that, when executed by the one or more computers, perform one or more operations, comprising:
      selecting, through a local terminal device associated with an owner of a service account associated with a service, a plurality of participants of a service, wherein the service for each of the plurality of participants starts at a start location and ends at an end location;
      verifying, by the local terminal device, user information of the owner;
      verifying, by the local terminal device based on facial recognition, identities of the plurality of participants;
      in response to successful verification of at least the user information of the owner and the identities of the plurality of participants, generating, by the local terminal device based on account information of the service account, one or more proof of payments for the plurality of participants by associating the verified identities of the plurality of participants to the one or more proof of payments and based on account information of the service account, wherein information content of each of the one or more proof of payments comprises quantity information indicating a quantity of participants of the plurality of participants having a same start location and a same end location;
      sending the one or more proof of payments and the identities of the plurality of participants to a payment verification system to verify a corresponding proof of payment for a corresponding quantity of participants;
      in response to the one or more proof of payments being verified, allowing an access control system to release the quantity of participants at the start location;
      sending, by the local terminal device, the one or more proof of payments to corresponding terminal devices of the plurality of participants; and
      in response to determining that the quantity of participants of the plurality of participants exit the same end location by presenting the corresponding proof of payment received on a participating terminal device associated with one of the plurality of participants, deducting a payment from the service account.

9. The computer-implemented system of claim 8, wherein verifying the user information includes verifying an identity of the owner, and the one or more proof of payments prove payments for the plurality of participants by the owner of the local terminal device.

10. The computer-implemented system of claim 9, wherein the identity of the owner is verified if the service account is successfully logged in.

11. The computer-implemented system of claim 8, wherein verifying the user information includes:

verifying that the owner has successfully logged in to the service account; and verifying the user information of the plurality of participants is performed after the plurality of participants are selected by the owner through the service account.

12. The computer-implemented system of claim 8, wherein the one or more proof of payments are one or more electronic proofs generated by the local terminal device.

13. The computer-implemented system of claim 8, wherein the service is a public transportation service, the plurality of participants are one or more passengers, the same start location is a departure station and the same end location is an arrival station.

14. The computer-implemented system of claim 8, wherein the one or more proof of payments are one or more two-dimensional codes and the one or more proof of payments are verified for a number of times that equals a number of the plurality of participants whose identities are successfully verified.

15. A non-transitory, computer-readable medium storing one or more instructions executable by a computer-implemented authentication system to perform one or more operations for generating proof of payment comprising:

selecting, through a local terminal device associated with an owner of a service account associated with a service, a plurality of participants of a service, wherein the service for each of the plurality of participants starts at a start location and ends at an end location;

verifying, by the local terminal device, user information of the owner;

verifying, by the local terminal device based on facial recognition, identities of the plurality of participants;

in response to successful verification of at least the user information of the owner and the identities of the plurality of participants, generating, by the local terminal device based on account information of the service account, one or more proof of payments for the plurality of participants by associating the verified identities of the plurality of participants to the one or more proof of payments and based on account information of the service account, wherein information content of each of the one or more proof of payments comprises quantity information indicating a quantity of participants of the plurality of participants having a same start location and a same end location;

sending the one or more proof of payments and the identities of the plurality of participants to a payment verification system to verify a corresponding proof of payment for a corresponding quantity of participants;

in response to the one or more proof of payments being verified, allowing an access control system to release the quantity of participants at the start location;

sending, by the local terminal device, the one or more proof of payments to corresponding terminal devices of the plurality of participants; and in response to determining that the quantity of participants of the plurality of participants exit the same end location by presenting the corresponding proof of payment received on a participating terminal device associated with one of the plurality of participants, deducting a payment from the service account.

16. The non-transitory, computer-readable medium of claim 15, wherein verifying the user information includes verifying an identity of the owner, and the one or more proof of payments prove payments for the plurality of participants by the owner of the local terminal device.

17. The non-transitory, computer-readable medium of claim 16, wherein the identity of the owner is verified if the service account is successfully logged in.

18. The non-transitory, computer-readable medium of claim 15, wherein verifying the user information includes:

verifying that the owner has successfully logged in to the service account; and verifying the user information of the plurality of participants is performed after the plurality of participants are selected by the owner through the service account.

19. The non-transitory, computer-readable medium of claim 15, wherein the one or more proof of payments are one or more electronic proofs generated by the local terminal device.

20. The non-transitory, computer-readable medium of any one of claim 15, wherein the service is a public transportation service, the plurality of participants are one or more passengers, the same start location is a departure station and the same end location is an arrival station.

21. The non-transitory, computer-readable medium of claim 15, wherein the one or more proof of payments are one or more two-dimensional codes and the one or more proof of payments are verified for a number of times that equals a number of the plurality of participants whose identities are successfully verified.

* * * * *

UNITED STATES PATENT AND TRADEMARK OFFICE
CERTIFICATE OF CORRECTION

PATENT NO. : 11,348,108 B2
APPLICATION NO. : 16/810683
DATED : May 31, 2022
INVENTOR(S) : Jiayin Liu It is certified that error appears in the above-identified patent and that said Letters Patent is hereby corrected as shown below:

In the Claims

Column 22, Lines 35-36, in Claim 20, after "medium of" delete "any one of".

Signed and Sealed this
Sixteenth Day of August, 2022

Katherine Kelly Vidal
*Director of the United States Patent and Trademark Office*